United States Patent

Huang

[11] Patent Number: 5,725,238
[45] Date of Patent: Mar. 10, 1998

[54] STROLLER WITH A STANDING MEANS

[76] Inventor: Li-Chu Chen Huang, No. 99, Fuchou 7th St., Chiayi, Taiwan

[21] Appl. No.: 677,463

[22] Filed: Jul. 2, 1996

[51] Int. Cl.⁶ .................................................. B62B 7/08
[52] U.S. Cl. .......................... 280/642; 280/650; 280/658; 280/302
[58] Field of Search .................. 280/642, 643, 280/644, 647, 650, 657, 658, 293, 301, 302; 297/354.12, 354.13

[56] References Cited

U.S. PATENT DOCUMENTS 5,478,102  12/1995  Haung ........................... 280/642
5,482,311   1/1996  Huang ........................... 280/642
5,605,409   2/1997  Haut ............................. 280/642
5,645,293   7/1997  Cheng ........................... 280/642

Primary Examiner—Richard M. Camby
Attorney, Agent, or Firm—Staas & Halsey

[57] ABSTRACT

A stroller with a standing means comprises a handle, a first supporting rod, a second supporting rod pivotally connected with the first supporting rod and having a folding means securely mounted thereon, a guarding rib, a U-shaped rib pivotally connected with the first supporting rod, the second supporting rod and the guarding rib and at least four wheels each connected to a distal end of the first supporting rod and the second supporting rod. The standing means is pivotally connected with the U-shaped rib for providing support to the stroller when the stroller is folded.

2 Claims, 5 Drawing Sheets

STROLLER WITH A STANDING MEANS

FIELD OF THE INVENTION

The present invention generally relates to a stroller, and more particularly to a stroller having a standing means enabling the stroller to remain in an upright position.

BACKGROUND OF THE INVENTION

This invention has a particular application to a standing means which helps a stroller to stably remain in the upright position when the stroller is not in use.

Strollers for transporting babies have been manufactured for many years, and the structures are getting more and more sophisticated whereby the stroller may be folded easily to even more compact status. Although strollers have been in use for quite a long time, however, a problem still occurs which is that once the stroller has been folded, it is difficult to keep it in an upright stable position. Therefore, a user will have to bend down to get a hold of the stroller and then expand it in order to have it ready to receive a baby. Such a bending sometimes is very hard for older people and especially for pregnant women, sometimes it is even dangerous for people who have back problem.

Thus, the present invention provides a standing means for a stroller whereby the stroller is able to remain in an upright, stable position when the stroller is folded, so that people will not have the bother of bending over to pick up the stroller.

SUMMARY OF THE INVENTION

The main objective of the invention is to provide a standing means for a stroller to maintain the stroller in an upright, stable position. One side of the standing means is pivotally connected to a U-shaped rib of the stroller, the other side of the standing means is thus suspended by a retaining means mounted on a pair of supporting ribs. Thus, when the stroller is folded, the descending motion of the U-shaped rib will lead the pivotally connected standing means to move downward and eventually touch the ground. With the standing means and a pair of wheels, the stroller is able to remain in an upright, stable position.

Another objective of the invention is that once the standing means is retained by the retaining means, it is not necessary to disconnect the connection between the standing means and the retaining means whether the stroller is in use or in storage.

Still another objective of the invention is to provide a standing means which will not increase the size of the stroller even when the stroller is folded.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
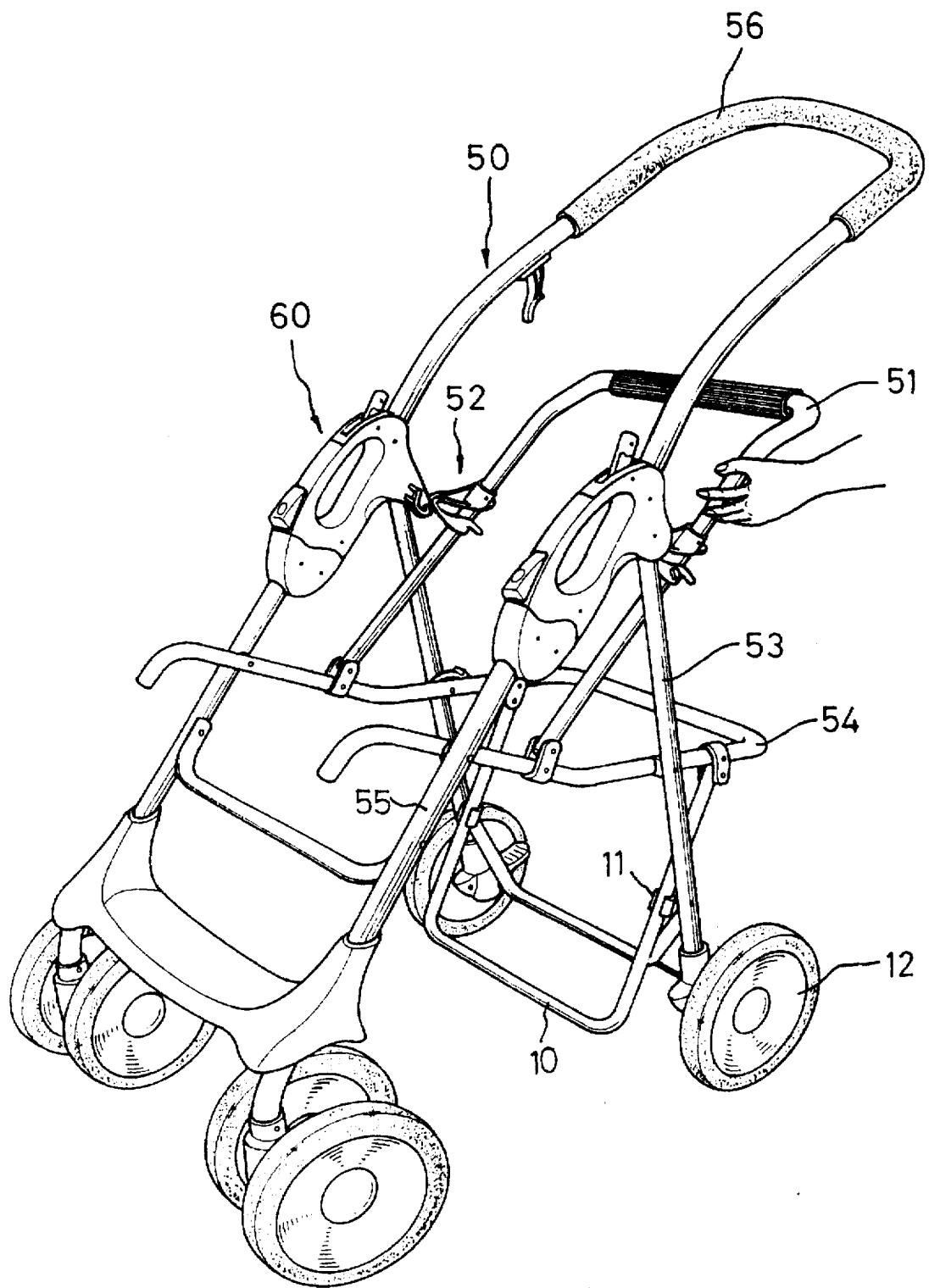
FIG. 1 is a perspective view of a stroller with a standing means provided thereto and shows a guarding rib is being retained by a first retaining means.
Figure 2:
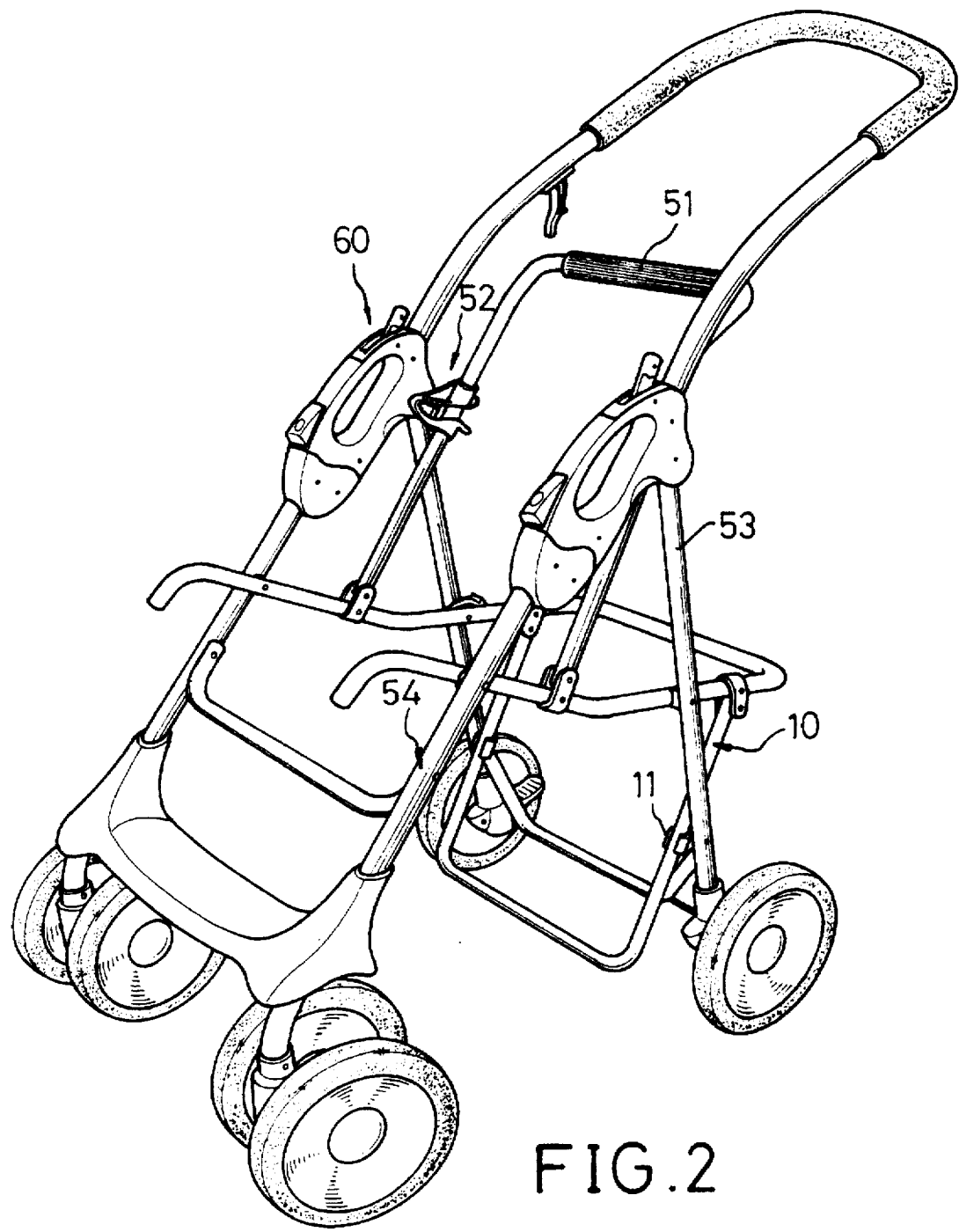
FIG. 2 is also a perspective view of the stroller indicating the guarding rib is retained by the first retaining means.

Referring to FIGS. 1 and 2, a substantially U-shaped standing means 10 is provided to a stroller 50 having a handle 56, a first supporting rod 53 pivotally connected with the handle 56, a second supporting rod 55 having a folding means 60 mounted thereto, a U-shaped rib 54 pivotally connected between the first supporting rod 53 and the second supporting rod 55, a guarding rib 51 pivotally connected with the U-shaped rib 54, and at least four wheels 12 each pivotally connected with a distal end of either the first supporting rod 53 or the second supporting rod 55. The guarding rib 51 is retained in position by a first retaining means 52 when the stroller 50 is being prepared to receive a baby. Two sides of the standing means 10 are pivotally connected to respective portions of the U-shaped rib 54 and a middle part of each of the sides of the standing means 10 is then suspended by a second retaining means 11 mounted to the first supporting rod 53 for providing support to the standing means 10 and avoiding dangling of the standing means 10 when the stroller is being in use.

Figure 3:
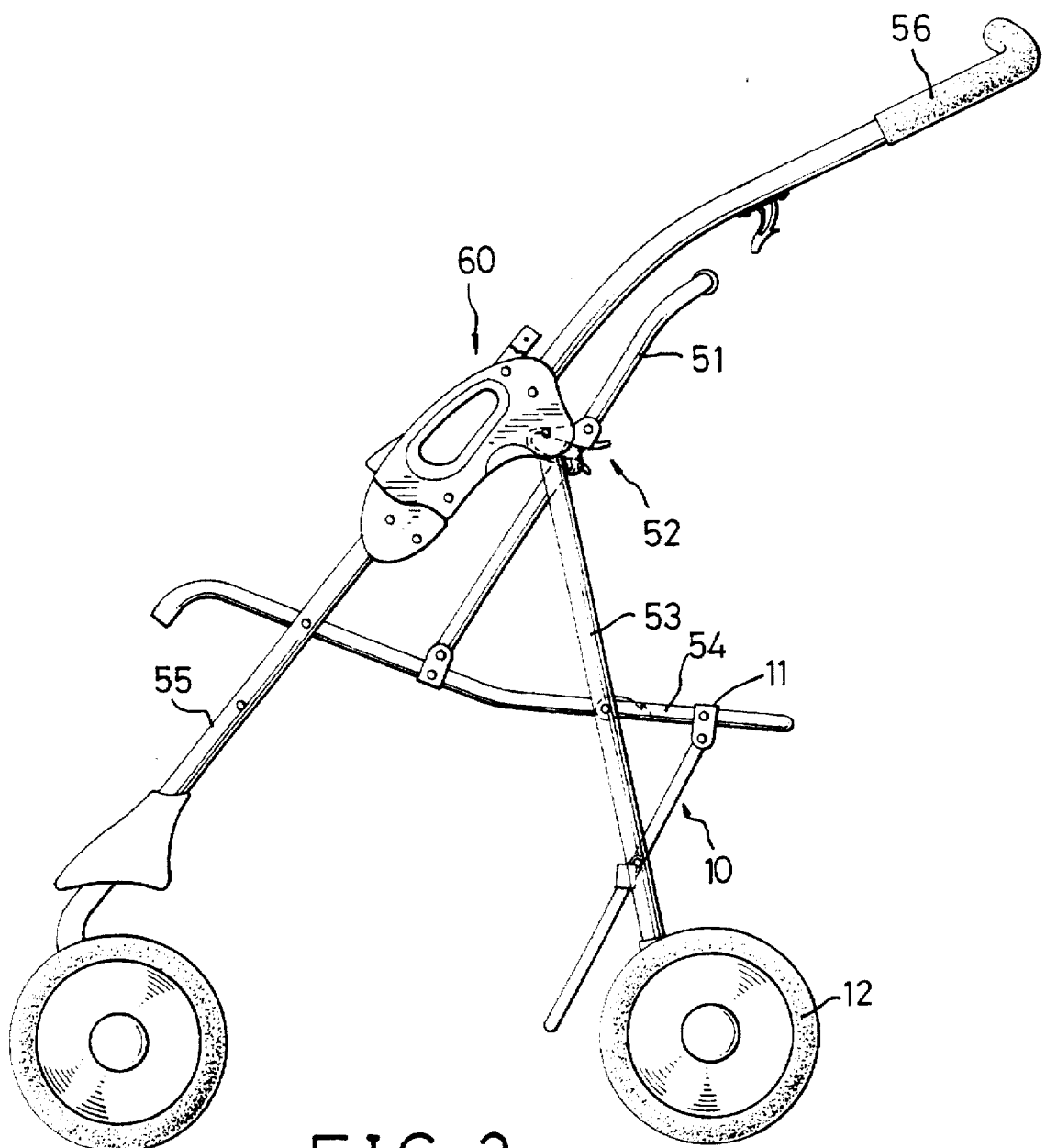
FIG. 3 is a side view of the stroller showing the pivotally connected standing means is being suspended by a second retaining means.
Figure 4:
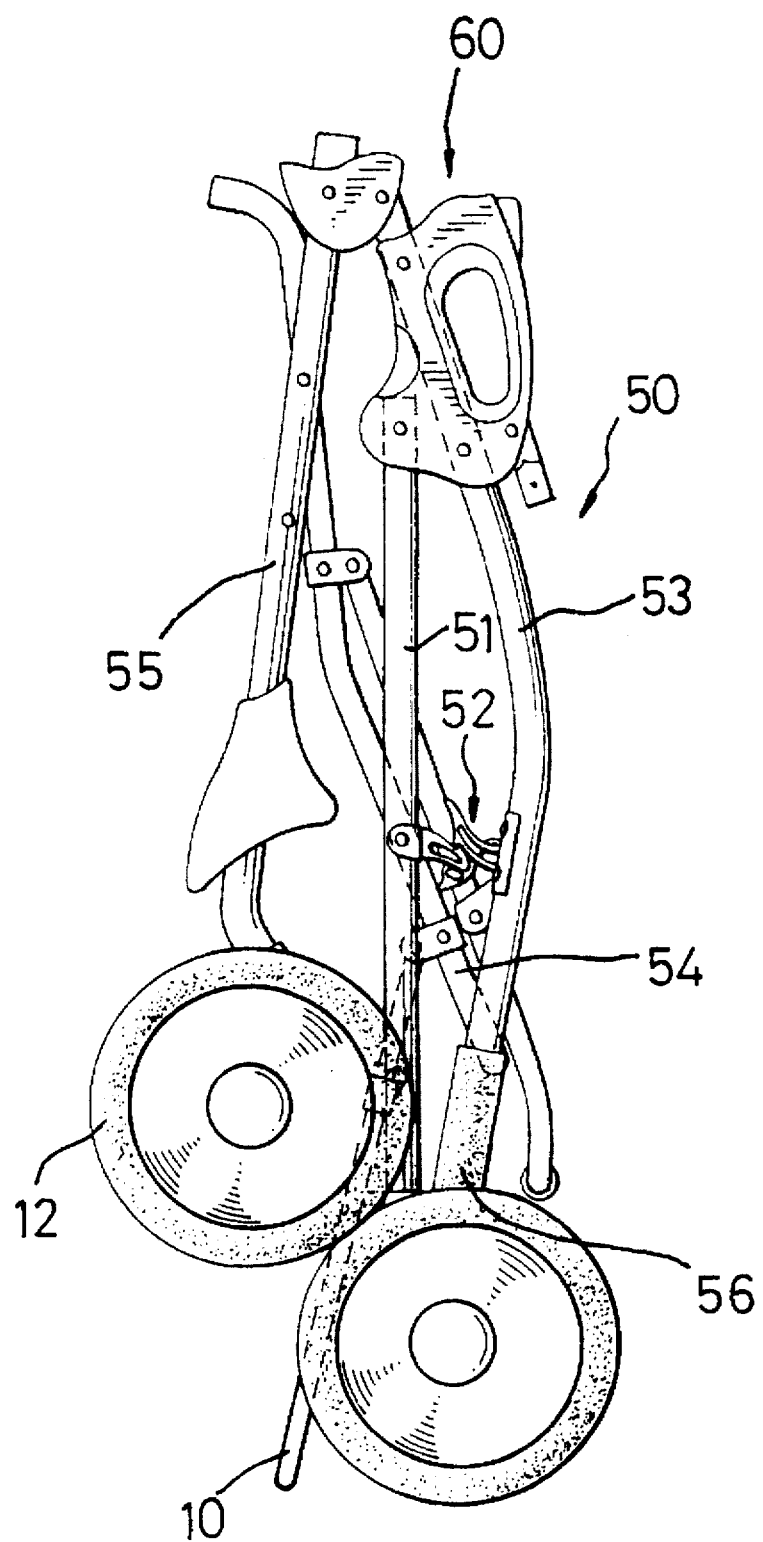
FIG. 4 is a side view of the folded stroller showing the standing means and a pair of wheels are able to keep the stroller in an upright position.

Referring to FIG. 3, it is clearly shown that one side of the standing means 10 is pivotally connected to the U-shaped rib 54, and a middle part of the standing means 10 is then securely connected to a second retaining means 11. Using the folding means 60 securely provided on the second supporting rod 55, the stroller 50 is able to be folded and with the help of the pivotally connected standing means 10, the stroller 50 is able to be kept in an upright, stable position, as shown in FIG. 4.

Figure 5:
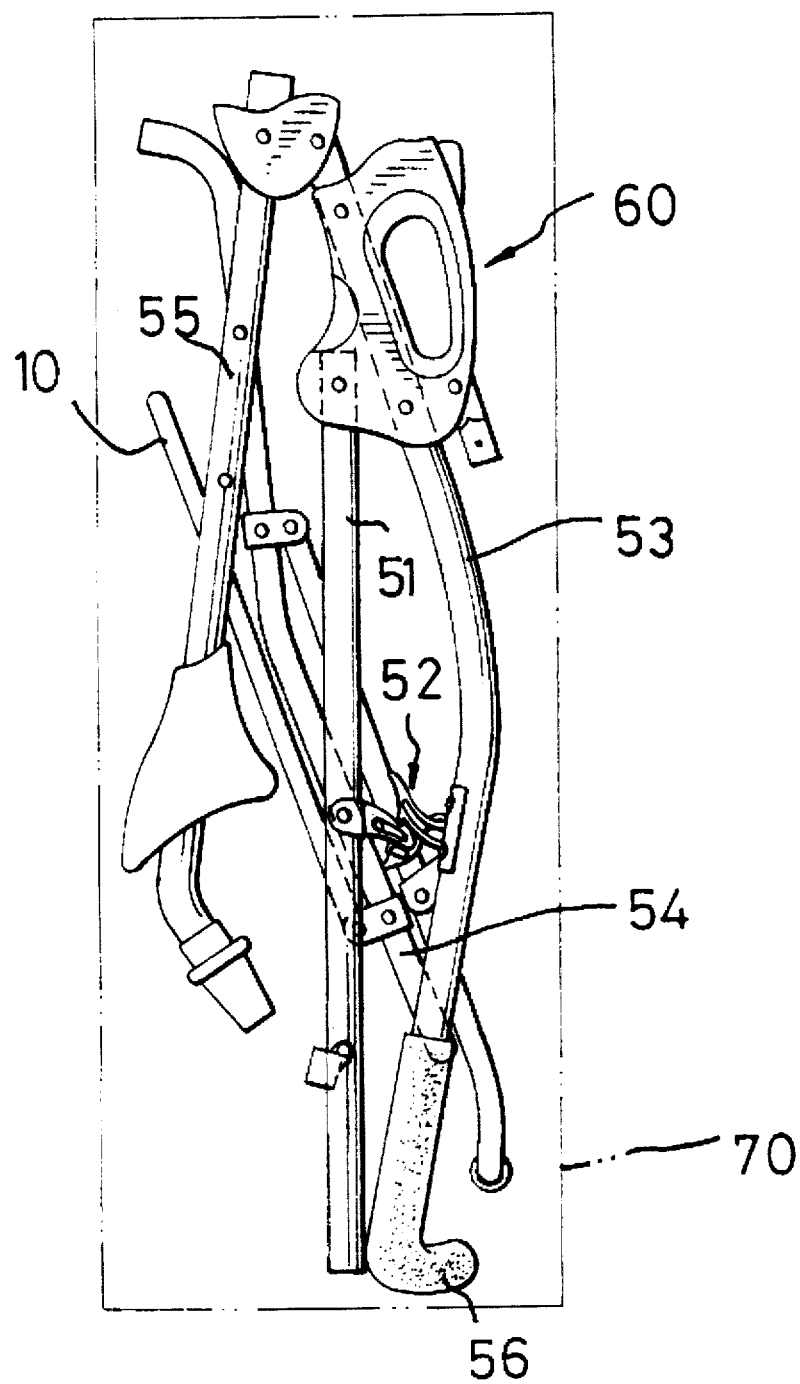
FIG. 5 is a preferred embodiment of the stroller with its wheels disassembled and encased within a box which shows in phantom line.

From the preferred embodiment of the invention as shown in FIG. 5, when the stroller 50 is ready for transportation, for example from a manufacturer to a retailer, it is better to remove all the wheels 12 before putting the stroller 50 into a box 70, and then use the folding means 60 to fold the stroller 50. It is to be noted that the stroller 50 of the invention occupies no extra space although the standing means 10 is provided.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A stroller comprising a handle, a first supporting rod, a second supporting rod pivotally connected with said first supporting rod and having a folding means securely mounted thereon, a guarding rib, a U-shaped rib pivotally connected with said first supporting rod, said second supporting rod and said guarding rib, and at least four wheels each pivotally connected to a distal end of one of said first supporting rod and said second supporting rod, the improvement wherein:

a substantially U-shaped standing means is provided to pivotally connect to said U-shaped rib for supporting said stroller when the stroller is being folded.

2. A stroller as claimed in claim 1, wherein said standing means is securely fixed by a second retaining means which is mounted on said first supporting means.

* * * * *